United States Patent [19]
Kolb

[11] 3,776,034
[45] Dec. 4, 1973

[54] METHOD FOR MEASURING FLUID FLOW IN UNITS OF MASS

[75] Inventor: Robert H. Kolb, Cypress, Tex.

[73] Assignee: Shell Oil Company, New York, N.Y.

[22] Filed: Apr. 13, 1971

[21] Appl. No.: 133,657

[52] U.S. Cl. ........ 73/194 M, 73/231 M, 235/151.34
[51] Int. Cl. .............................................. G01f 1/04
[58] Field of Search ..................... 73/194 R, 194 M, 73/231, 231 M; 235/151.34

[56] References Cited
UNITED STATES PATENTS

| 3,678,257 | 7/1972 | Lilley et al. | 73/194 M |
| 2,974,525 | 3/1961 | Cole | 73/231 M |
| 3,164,017 | 1/1965 | Karlby et al. | 73/194 M |
| 3,566,685 | 3/1971 | Zimmerman et al. | 73/194 |

Primary Examiner—Richard C. Queisser
Assistant Examiner—John P. Beauchamp
Attorney—Theodore E. Bieber and Harold L. Denkler

[57] ABSTRACT

A method and apparatus for simultaneously measuring the volume and the density of a fluid stream and totalizing the product of the two measurements to provide the mass units of fluid delivered by the stream. The apparatus also includes means to accommodate zero suppression of the density measurements so that the final product is a numerical indication of the actual number of mass units delivered.

2 Claims, 2 Drawing Figures

PATENTED DEC 4 1973　　　　　　　　　　　　3,776,034

R. H. Kolb
INVENTOR

METHOD FOR MEASURING FLUID FLOW IN UNITS OF MASS

CROSS-REFERENCES TO RELATED APPLICATIONS

This application is related to a co-pending application of G. C. Lilley and R. H. Kolb, entitled, "Method and Apparatus for Determining the Volumetric Average of a Parameter," filed on June 17, 1970, Ser. No. 47,060, now U.S. Pat. No. 3,678,257.

BACKGROUND OF THE INVENTION

The present invention relates to a method for simultaneously measuring the volume and the density of a delivered fluid and continually generating and integrating the product of the measured variables as the delivery progresses to provide at the end of the delivery a numerical indication of the number of mass units of fluid delivered. The advantages of a mass flow measurement as opposed to the more conventional volume measurement of fluids is a more direct determination of the quantity of fluid delivered expressed in units of mass. For example, oil is conventionally measured in barrels of volume and then corrected for bulk compressibility and thermal expansion to an equivalent volume in standard barrels at standard conditions and pressure. Further, the density of the oil is measured and corrected for thermal expansion to an equivalent density at standard conditions expressed in degrees of gravity. The quantity of oil delivered is then recorded in standard barrels of oil of the particular gravity. This information, of course, specifies exactly the number of mass units of fluid in the delivery.

From the above, it can be appreciated that in order to obtain the number of mass units in the delivery by the conventional method it is necessary to measure: 1) the volume of the delivery; 2) the temperature of the oil; 3) the coefficient of thermal expansion of the oil; 4) the pressure to which the oil is subjected at the time of the volume measurement; 5) the compressibility factor of the delivered oil at the delivered temperature; 6) the gravity or density of the delivered oil and 7) the temperature of the density sample. While systems are available for making all the above measurements, it does require considerable equipment and each individual measurement is subject to error and contributes cumulatively to the overall error. Further, even after the measurements are made, one must still compute the delivered fluid in mass units utilizing the aforesaid measurements.

SUMMARY OF THE INVENTION

The present invention solves the above problems by utilizing measurements made of the flowing stream to provide an output signal which is related to the number of mass units of fluid delivered. In particular, this system utilizes a sensing device to measure the density of the flowing stream and a volume meter to measure the volume of the stream. The signal from the density measurement is used to control a circuit whose output is a pulse having a duration that varies in relation to the density. The pulse from the circuit is transmitted to an integrating circuit each time the pulse transmitter is activated by a signal from the volume meter. In particular, the volume meter activates the pulse transmitter each time a predetermined volume of liquid passes through the meter. The integrating circuit is a totalizer that totalizes the total time duration of the transmitted pulses.

The system can also accommodate a zero suppression circuit within the density sensor such as is often provided to increase accuracy. For example, if it is assumed that the density sensor and connected pulse transmitter provide an output signal of zero duration when the density expressed in specific gravity units is 0.8000, and of 10 seconds duration when the density expressed in specific gravity units is 0.9000, some means must be provided for compensating for the zero suppression. The system utilized is a second pulse transmitter which is arranged to transmit a pulse of a fixed duration preset in accordance with the density value which yields zero pulse length from the first transmitter. The second pulse transmitter is also actuated by the volume meter with the output pulse duration being supplied additively to the totalizer in such a manner that the totalizer integrates the sum of the durations of both pulses.

The integrating or totalizing circuit may be comprised of a synchronous motor driving a totalizing mechanism through a magnetic clutch. Thus, the pulses from the pulse transmitter may be used to actuate the magnetic clutch so that the totalizer sums the rotation of the synchronous motor and, in effect, integrates the product of the volume and the density. The use of two synchronous motors to drive the totalizer additively will permit the system to totalize the fluid flow in mass units in those instances when the density sensor incorporates zero suppression. Thus the numerical output of the totalizer will be related to the total flow of the fluid in mass units.

BRIEF DESCRIPTION OF THE DRAWINGS

The present invention will be more easily understood from the following detailed description of a preferred embodiment when taken with the attached drawings in which.

DESCRIPTION OF PREFERRED EMBODIMENT

Figure 1:
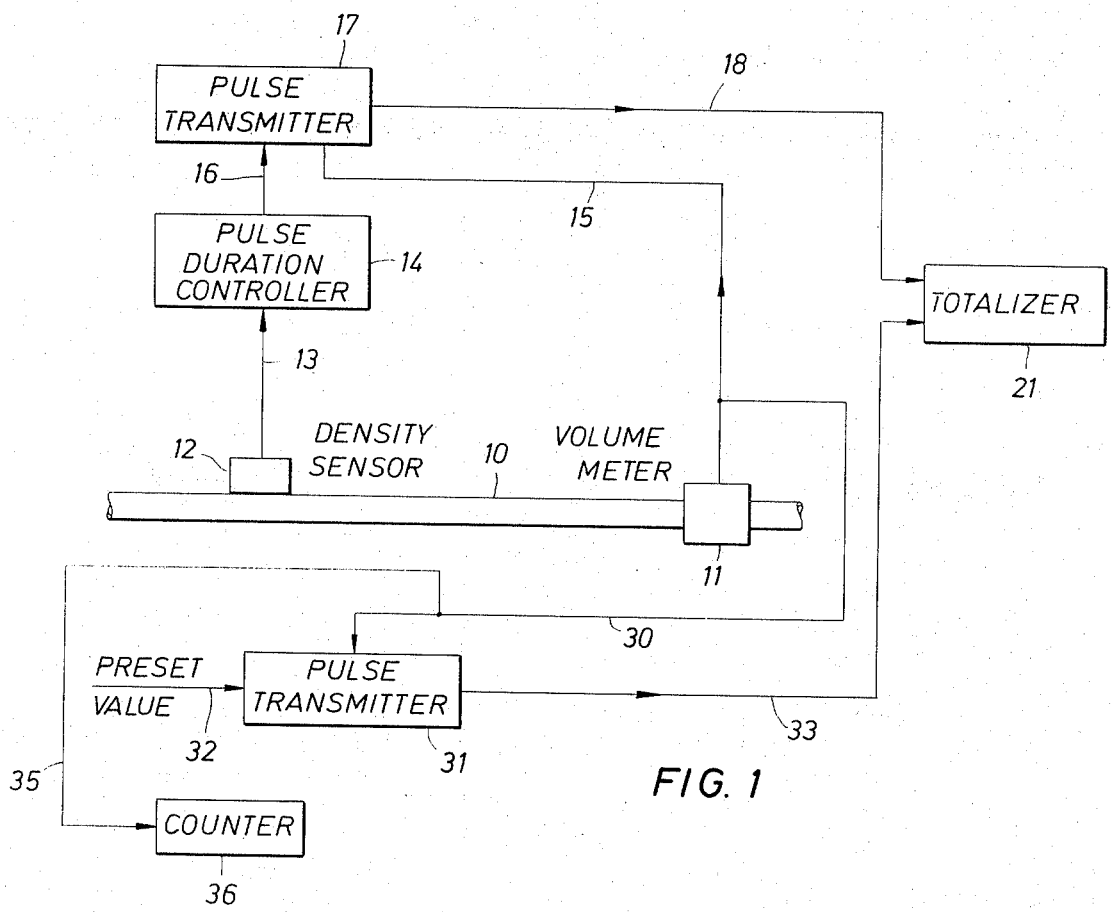
FIG. 1 is a block diagram of an apparatus suitable for practicing the method of this invention.

Referring now to FIG. 1, there is shown a system suitable for determining the total in mass units of fluid delivered by the pipeline 10. This system is particularly adapted for determining the flow of hydrocarbon liquids in mass units without the necessity of determining various parameters of the liquid. The system utilizes a volume meter 11 of the type which provides an output for each predetermined volume of liquid passing through the meter. The meter may be a turbine-type meter or a positive displacement meter that produces a pulse for each volume of fluid passing through the meter. The density of the liquid in the pipeline 10 is sensed by sensor 12 which supplies an electrical output signal. The density may be measured by any well-known commercially available sensor whose output is in the form of an electrical signal. The electrical signal is supplied to a pulse duration controller 14 which converts the sensed density to an electrical signal whose duration varies in relation to the density. For example, the pulse duration controller may supply a signal of zero duration when the density in specific gravity units is 0.8000 and a signal of 10 seconds duration when the specific gravity is 0.9000. A suitable density measuring cell and pulse duration controller is manufactured by Automation Products Inc., Houston, Texas, and referred to as Dynatrol Density System.

A signal from the volume meter is supplied over lead 15 to a pulse transmitter 17 which transmits the pulse duration signal from the controller 14. The pulse transmitter 17 is designed to transmit a signal whose duration represents the density of the liquid once for each predetermined volume of liquid passing through the meter. For example, the pulse transmitter could transit the density signal once for each 10 barrels of fluid flow. The signal from the pulse transmitter is supplied over a lead 18 to a totalizer 21 which integrates or sums the cumulative total duration of the density signal. For example, the pulse duration signal could be used to actuate a rotating device with the total rotation of the device being equal to the sum of the rotations of each of the pulses received. The totalizer 21 is also the point where rotation proportional to the density signal is combined with rotation representing the output of the zero suppression accommodation system. This can be accomplished simply through the use of a differential transmission assembly.

Any zero suppression which is incorporated in the density signal is handled in substantially the same way as explained above. More particularly the signal from the volume meter is supplied to a second pulse transmitter 31 which transmits an electrical signal whose duration is a fixed preset value. The duration of the signal is preset to correspond to that density of the fluid which provides a zero duration signal from the pulse duration controller 14. The second pulse transmitter 31 is connected by a lead 33 to the totalizer 21 so that the signal whose duration represents the zero suppression level may be combined additively with the signal whose duration represents density changes within the active range of the density sensor.

Figure 2:
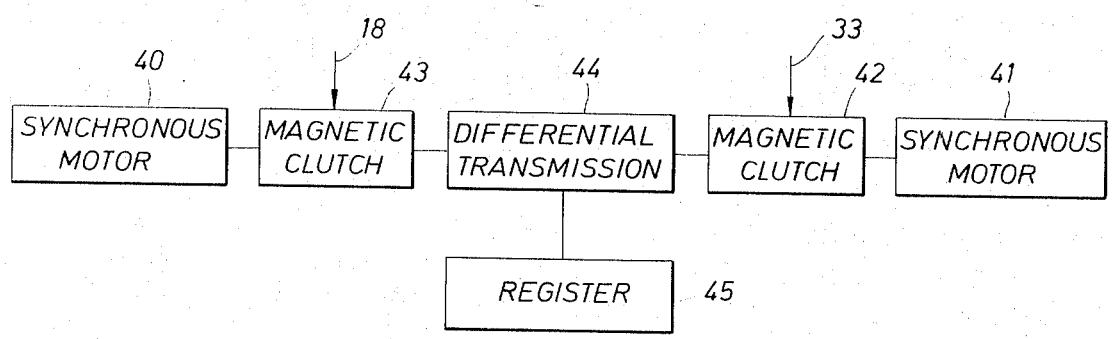
FIG. 2 is a block diagram of the totalizer 21 shown in FIG. 1.

Referring to FIG. 2, there is shown one system which may be used for totalizing the above signals. More particularly, there is shown a numerical register or rotation counter 45 which is driven by synchronous motors 40 and 41. In particular, the synchronous motors should be coupled to the totalizers so that the rotation due to the zero suppression accommodation signal is added to the rotation due to the signal representing density changes within the active range. The synchronous motors are coupled to the totalizers through magnetic clutches 42 and 43. The magnetic clutches, in turn, are controlled by the signals from the pulse transmitters 17 and 31 which are supplied to the magnetic clutches over the leads 18 and 33. Thus, the register will be advanced by an amount proportional to the measured density of the fluid each time a predetermiend volume of fluid passes through the pipeline 10. Zero suppression in the density sensor signal is accommodated by combining two separate rotations, one proportional to the suppression level and one proportional to the amount the actual density exceeds the suppression level. The differential transmission permits combining these two and entering them into the register independently but simultaneously. This will produce a numerical output indicating the actual mass units of fluid delivered by the pipeline.

While the combination of synchronous motors and magnetic clutches have been shown as a means for combining the various signals, other means could also be used. For example, an electronic circuit including gates, a reference frequency and digital counters could be used; also mechanical systems could be used where the meter rotation is used to drive a mechanical counter through a clutch controlled by the density measuring means. The important requirement is that the means provide an increase in totalizer registration proportional to the stream density each time the selected volume passes through the meter.

I claim as my invention:

1. A method for computing the total mass units of a fluid delivered by a flowing stream, said method comprising:
    measuring the volume of the fluid delivered and producing a first signal each time a predetermined volume is delivered;
    measuring the density of the fluid delivered and converting the measurement to a second signal whose duration is related to the density of the fluid delivered;
    determining the density of the fluid delivered that produces a zero time duration of said second signal by producing a third signal related to the density that produces a zero time duration signal;
    obtaining the product of the first and second signals and adding said products to obtain a numerical indication of the number of mass units delivered; and
    obtaining a second product of said first and third signals and combining additively said first mentioned product and said second product.

2. The method of claim 1 wherein the measured volume is converted to a series of pulses, each pulse representing the delivery of a predetermined volume of fluid, said pulses being combined with said second signal to obtain the numerical indication of the number of mass units delivered.

* * * * *